(12) United States Patent
Dudot

(10) Patent No.: US 10,953,528 B2
(45) Date of Patent: Mar. 23, 2021

(54) EXTRACTION PROCESS OF A GLOW PLUG PENCIL FOR A MOTOR VEHICLE AND THE TOOLING SET FOR THE IMPLEMENTATION OF SUCH A PROCESS

(71) Applicant: HUBITOOLS SA, Wavre (BE)

(72) Inventor: Yannick Dudot, Cappel (FR)

(73) Assignee: HUBITOOLS SA, Wavre (BE)

( * ) Notice: Subject to any disclaimer, the term of this patent is extended or adjusted under 35 U.S.C. 154(b) by 73 days.

(21) Appl. No.: 15/927,941

(22) Filed: Mar. 21, 2018

(65) Prior Publication Data

US 2018/0272513 A1    Sep. 27, 2018

(30) Foreign Application Priority Data

Mar. 21, 2017    (BE) .................................... 2017/5175
Mar. 24, 2017    (FR) ..................................... 1770295

(51) Int. Cl.
*B25B 27/18*    (2006.01)
*B25B 27/02*    (2006.01)
(Continued)

(52) U.S. Cl.
CPC ............. *B25B 27/18* (2013.01); *B23B 35/00* (2013.01); *B23G 1/18* (2013.01); *B23G 5/062* (2013.01);
(Continued)

(58) Field of Classification Search
CPC ............... B25B 27/0035; B25B 27/18; B25B 27/02–27/12; B23P 19/025; Y10T 29/49815–49824
(Continued)

(56) References Cited

U.S. PATENT DOCUMENTS 5,075,947 A    12/1991    Jessup et al.
5,109,739 A    5/1992    Hull et al.
(Continued)

FOREIGN PATENT DOCUMENTS

DE    202005003641    6/2005
DE    102007025745    12/2008
(Continued)

OTHER PUBLICATIONS

Machine Translation DE 202010011133 U1, which DE '133 was published Dec. 2010.*
(Continued)

*Primary Examiner* — Erica E Cadugan
(74) *Attorney, Agent, or Firm* — Hanley, Flight & Zimmerman, LLC

(57) ABSTRACT

The invention involves the extraction process of a glow plug pencil (23) or a broken pencil (23) which is stuck in a cylinder head (13) housing (11) of a glow plug engine comprising a lower (19) and upper (17) part, so that the upper part (17) forms a shoulder (21) with the lower part (19), the pencil (23) being stuck in the lower part (19). The process is remarkable in that it includes a step (a) for drilling a bore in the pencil (23) according to the longitudinal direction of the latter which is performed with the use of a drill bit (1) comprising a drilling part (5) with flutes (7) and a shank (3) respectively having a diameter smaller and greater than the lower part diameter (19) of the housing (11) so that the shank (3) forms a shoulder (9) with the drilling part (5), and in that step a) for drilling the bore includes the drilling of the pencil (23) until the said shoulder (9) of the drill bit (1) is positioned to a stop against the shoulder (21) of the housing (11).

3 Claims, 3 Drawing Sheets

(51) Int. Cl.
  *B23B 51/00* (2006.01)
  *B23G 5/06* (2006.01)
  *B25D 1/16* (2006.01)
  *B23P 19/04* (2006.01)
  *B23G 1/18* (2006.01)
  *B23B 35/00* (2006.01)
  *B25D 1/14* (2006.01)
  *B25B 27/00* (2006.01)
  *B23P 19/02* (2006.01)
  *B23P 6/02* (2006.01)

(52) U.S. Cl.
  CPC ............ *B23G 5/066* (2013.01); *B23P 19/025* (2013.01); *B25B 27/0035* (2013.01); *B25B 27/02* (2013.01); *B25D 1/14* (2013.01); *B25D 1/16* (2013.01); *B23B 2215/24* (2013.01); *B23B 2251/248* (2013.01); *B23B 2260/0482* (2013.01); *B23B 2260/12* (2013.01); *B23B 2270/34* (2013.01); *B23P 6/02* (2013.01); *B25D 2250/171* (2013.01); *B25D 2250/361* (2013.01); *Y10T 29/49815* (2015.01); *Y10T 29/5143* (2015.01); *Y10T 408/8725* (2015.01)

(58) Field of Classification Search
  USPC ............................................. 29/426.1–426.3
  See application file for complete search history.

(56) References Cited

U.S. PATENT DOCUMENTS

| | | | | |
|---|---|---|---|---|
| 5,649,791 | A * | 7/1997 | Connolly | B23B 47/284 408/1 R |
| 6,427,303 | B1 * | 8/2002 | McConnell | B25B 27/0035 29/255 |
| 7,779,733 | B1 * | 8/2010 | Dumback | B25B 7/02 29/426.1 |
| 2006/0260110 | A1 * | 11/2006 | Klann | B25B 13/48 29/282 |
| 2010/0077891 | A1 * | 4/2010 | Abu-Alfaraj | B25B 27/0035 81/53.2 |
| 2018/0281164 | A1 | 10/2018 | Dudot | |

FOREIGN PATENT DOCUMENTS

| | | |
|---|---|---|
| DE | 202010011133 | 12/2010 |
| DE | 202012008592 | 11/2012 |
| EP | 2826580 | 1/2015 |
| JP | 8261114 | 12/2010 |

OTHER PUBLICATIONS

Machine Translation EP 2826580, which EP '580 was published Jan. 2015.*

Amazon listing from www.amazon.com re Supercrazy 16 pcs Glow Plug Removal Remover Tool Kit 8mm 10 mm, 13 pages, printed Dec. 12, 2019.*

Human translation of DE 102007025745 A1, which DE '745 was published Dec. 4, 2008; 34 pages.*

European Patent Office, Search Report, issued in connection with Belgium Application No. BE201705175, dated Nov. 20, 2017, 10 pages.

* cited by examiner

EXTRACTION PROCESS OF A GLOW PLUG PENCIL FOR A MOTOR VEHICLE AND THE TOOLING SET FOR THE IMPLEMENTATION OF SUCH A PROCESS

BACKGROUND

The invention belongs to the process and tooling area for the automobile mechanics and specifically involves the processes and tools for the extraction of glow plug pencils related to a vehicle engine, for example a motor vehicle.

On a diesel engine, the air should be warm enough at the end of compression to allow fuel ignition. When the engine is cold the glow plugs enable the creation of a hot spot which increases the temperature of the combustion chambers and leads to the fuel ignition. On new engines with "common rail" technology, glow plugs are also used to reduce smoke emissions when the engine starts and to take part in the post-combustion-to-regeneration phase of the particulate filter.

Conventionally, glow plugs include a metal body with a terminal on one end and a pencil on the other end. The terminal corresponds to the open end of a connecting central shank going through the glow plug in a longitudinal direction so as to reach the pencil. The terminal is connected to the electrical system of the vehicle. The pencil includes a heating coil that extends partly in the combustion chamber. When the power of the glow plug is on, this spiral will heat and warm up the combustion chamber.

The glow plugs are housed in the cylinder head of the engine. The housing of each spark plug crosses the cylinder head from the outside up to a combustion chamber. Since the pencil tool of the glow plug is narrower than the body, the housing includes a lower part to house the pencil and another one wider to house the body of the plug. The lower part forms a shoulder section with the upper part, and leads to the combustion chamber. The housing part of the spark body includes an inner thread at the mouth that allows you to screw the glow plug in its housing. When the glow plug is worn and must be changed, the latter is unscrewed from its housing by the outside. When unscrewing, it may happen that the glow plug breaks and the pencil is still stuck in its narrow housing. This break may appear at the shoulder level of the plug housing or within the lower part of the housing There are very well known processes and tools that enable the removal of the pencil being stuck in its housing. Traditionally, the processes include a first step for drilling a bore in the pencil with the use of a drill bit that has a diameter smaller than the pencil diameter, then a step dealing with the thread of the bore using a tap, a step for screwing an extractor in the thread, and finally a step for extracting the pencil with the removal of the extractor screwed to the pencil.

During the drilling step, it is important to center the drill bit properly against the pencil. For this purpose, document DE202012008592 describes a guide in two parts with a second guide donned on a first guide, and is positioned before the drilling step. To begin, the first guide is screwed into the thread of the plug housing, then the second guide slides into the housing of the plug body until it has reached the edges of the pencil housing. The second guide is then set on the first one using a hex wrench and a clamping screw. The second guide is hollow and allows the drill bit to go through during the drilling step. So that the drill bit does not penetrate too far with a risk of weakening the pencil, or even of breaking it, a ring is visible around the drill bit shank. This ring is fixed at a certain distance from the drill bit using a hex wrench and a clamping screw, letting it free to drill the pencil properly while preventing it to go too far. The drilling step ends when the ring is inserted until it is positioned to a stop against the second guide.

Unfortunately, such a guide does not correspond to all types of engine environment, especially when these are congested. The mounting of the second guide on the first one then becomes very difficult because there is not sufficient space to tighten with the hex wrench. The same goes for the tightening of the ring on the drill bit. In addition the installation of the ring at a good distance from the second guide requires a prior marking in relation to an intact and similar glow plug. There is therefore a need for a process and extraction tools for the pencil of a glow plug that are both operated in a congested engine environment and which do not require the use of an intact and similar glow plug.

Furthermore, diesel combustion in the combustion chamber leads to high pressures that may be responsible for the distortion of the pencil open end as set in this chamber, in particular in the event of the injector failure leading to the combustion chamber. The pencil extraction through the plug housing is then impossible. Therefore, there is also a need for a process and tools that enable the extraction of a pencil differently.

SUMMARY

The invention is intended to meet at least one of the problems of the previous method by offering a new process and tools for extracting a pencil from a glow plug that are easy to use, operated in a congested environment, suitable to any type of glow plug and which do not require prior adjustments.

To do this, the purpose of this invention is an extraction process for a glow plug pencil or a broken pencil which is stuck in a glow plug housing comprising a lower and upper part, the upper one with a diameter greater than the lower part diameter so that the housing features a shoulder, the pencil being stuck in the lower part of the plug housing, the process comprising the following steps:

a) drilling a bore in the pencil according to the longitudinal direction of the latter using a drill bit which is made of a drilling part with at least a flute and a shank, the said drilling part has a smaller diameter than the pencil diameter;

b) thread of the bore drilled in step a) in the pencil with a tap which has a tapping part with at least a flute and at least a comb and a shank, the said thread part has a diameter larger than the bore diameter and smaller than the pencil diameter;

c) screwing an extractor in the said thread, the extractor comprising a threaded head through which the latter is screwed to the pencil and located to one of the shank ends;

d) pencil extraction through the removal of the screwed extractor in the pencil, the process is remarkable in that the drill bit is chosen so that its shank has a diameter greater than the diameter of its drilling part so that the drill bit includes a shoulder, and the diameter of the lower part of the plug housing, and in that step a) dealing with the drilling of the bore includes the drilling of the pencil until the shoulder of the drill bit is positioned to a stop against the shoulder of the glow plug housing.

The diameter of the drill bit shank is preferably designed to operate with the inner walls of the housing upper part in order to center the drilling part of the drill bit against the pencil in step a) dealing with the drilling of the bore in the pencil.

As it will be understood after reading the definition which has just been given, the invention provides a drill bit with a shoulder between the drilling part and its shank so that the latter can come to a stop against the shoulder of the plug housing, indicating the end of the drilling for step a). Therefore step a) can be performed on any type of glow plug. Thanks to its diameter the shank favorably has little clearance in the housing of the plug body and thus allows to center the drilling part in a simple and proper manner. In addition, the drill bit can be wedged in the housing of the glow plug even in a congested engine environment.

According to a particular performance mode, the tap shank has a diameter greater than the tapping part diameter so that the tap has a shoulder and also the diameter related to the lower part of the housing, and in that the thread at step b) includes the thread of the bore until the shoulder of the tap is positioned to a stop against the shoulder of the glow plug housing. Thus, the setting to a stop of the tap shoulder against the shoulder of the plug housing indicates that the step b) has been completed.

The tapping part of the tap preferably has the same length or a length smaller than the drilling part of the tap. The diameter of the tap shank is preferably designed to work together with the inner walls of the housing upper part in order to center the tapping part of the tap against the pencil in step b) during the thread of the bore performed in step a).

According to a particular operating procedure, the extractor shank includes a nozzle positioned at the end opposite to the one related to the threaded head and with a diameter greater than the shank diameter, and step c) includes the following sub-steps:
  c1) the donning of the extractor through its threaded head in a sledge hammer with a cylindrical and hollow shape;
  c2) screwing of the extractor in the thread through its threaded head;
  and the removal of the extractor in step d) during the removal of the pencil is performed by striking the sledge hammer against the nozzle of the extractor shank according to the removal direction. Thus the invention allows to easily remove the extractor without requiring a lot of strength or a lot of space in the engine environment.

According to an additional operating procedure of the invention, the lower part of the plug housing of the candle and a housing for an injector opening by one of their ends on a combustion chamber, when the pencil extraction in step d) leading to the breakage of the latter so that a broken part of the pencil is still stuck in the lower part of the plug housing, the process is remarkable in that it also includes the following steps:
  f) driving out the pencil broken part in the combustion chamber using a push bar comprising a shank with one head on its end, the expulsion being achieved by striking on the push bar using a striking tool so that its head rests on the pencil broken part; and
  g) the recovery of the pencil broken part through the housing of an injector opening on the said combustion chamber using a collector comprising a magnetic part.

The invention thus gives an additional means to extract the pencil. In fact, when the very shortest part of the pencil is still stuck in the lower part of the plug housing, it is not possible to drill it and manage to insert the extractor inside with a risk of breaking it afterwards. Preferably, these steps related to the extraction process do not require the installation of a bore.

In addition, steps f) and g) can be performed as an alternative to steps a), b), c) and d) when the broken pencil stuck in the plug housing is too short.

According to another additional operating procedure of the invention, the lower part of the plug housing is a housing for an injector opening by one of their ends on a combustion chamber, when it is not possible to perform step f) because the pencil that is still stuck in the lower part of the housing, the process is remarkable on the basis that it also includes the following steps:
  e) unscrewing the pencil extractor and removing the extractor;
  f) driving the pencil out of the combustion chamber using a push bar comprising a shank with one head on its end, the driving out procedure is performed by striking on the push bar with a striking tool so that its head rests on the pencil; and
  g) the recovery of the pencil through the housing of an injector opening on the said combustion chamber using a collector comprising a magnetic part.

The invention thus allows you, when it is not possible to remove the extractor because the end of the pencil overlooking the combustion chamber is distorted and blocked, to recover the pencil through another housing, the injector housing in this case. This housing is favorably wider than the plug housing and allows you to easily push the distorted pencil.

According to an operating procedure of the invention, the upper part of the plug housing with an inner thread on at least a part of its walls, the process is remarkable in that the drilling of a bore during step a) is preceded by the installation of a centering device at the mouth of the upper part of the plug housing for the positioning of one or several elements selected from among:
  a drill bit during the boring operation of the pencil;
  a tap during the thread operation of the bore;
  an extractor when screwing the latter in the thread of the pencil;
  a push bar during the driving out operation of the pencil.

The centering device preferably includes an additional outer thread of the inner thread for the upper part of the housing and is screwed on the said inner thread.

In addition the invention involves a set of tools for the implementation of the process for extracting the pencil of a glow plug as described previously, the said pencil being stuck in a plug housing comprising a lower part and an upper part, the said lower part has a preset diameter "d", the pencil being stuck in the said lower part, the tool set is remarkable because it includes at least a drill bit with a drilling part and a shank, this shank has a diameter greater than the drilling part diameter regarding the drill bit so that the drill bit has a shoulder and is selected to have a diameter greater than the diameter "d" related to the lower part of the plug housing, and in that the tool set also includes one or several elements selected from among:
  at least a tap for threading the bore of the pencil;
  at least an extractor for extracting the pencil;
  a sledge hammer to remove the extractor;
  a push bar to expel the pencil;
  a collector to retrieve the pencil in a combustion chamber; and
  at least a centering device for positioning and guiding one or several elements selected from among:
    a drill bit during the boring operation of the pencil;

a tap during the thread operation of the bore;
an extractor when screwing the latter in the thread of the pencil;
a push bar during the driving out operation of the pencil.

The tool set preferably includes at least an extractor and a sledge hammer, and the extractor is made of a shank which has a threaded head on one of its end and the other end has a nozzle which has a diameter greater than the shank diameter, and this sledge hammer is crossed on both sides by a central duct comprising a diameter greater than the extractor shank diameter and smaller than the diameter of the shank nozzle.

The tool set preferably includes at least an extractor comprising a shank which has a threaded head on one of its ends, this threaded head has a diameter smaller than this shank diameter, the end of this shank with a tapped bore and the threaded head being screwed in the tapped bore of the shank. So the extractor of the invention prevents breaking points regarding the threaded head when screwing on the tap in the tapped bore performed in the pencil, the breaking of which would imply that the shank threaded head is disengaged. In fact, the threaded head is held here according to its length in the tapped bore of the extractor shank and is more resistant to exertions. Preferably, the threaded head can also be replaced due to wear and tear. The threaded head is preferably made of a material different to the shank one, preferably still made of a more rigid material. Consequently the threaded head is subject to a lower risk of being separated from the body.

The tool set preferably includes at least a tap to thread the pencil bore and comprising a tapping part and a shank, and the tapping shank has a diameter greater than the diameter of the tapping part in order to form a shoulder with the tapping part and is chosen to have a diameter greater than the diameter "d" of the lower part of the plug housing.

The tool set preferably includes at least a tap to thread the pencil bore and including a tapping part and a shank, this tapping part comprising flutes and combs and an entry followed by a guide, this entry being an entry with spiral point so that the flutes bear a grinder stroke. An entry with a spiral point has the advantage of being a tapered entry which facilitates the centering of the tap in relation to the bore during the tapping operation.

The tool set preferably includes at least a tap to thread the pencil 35 bore and comprising a tapping part and a shank, and the tapping shank has a diameter greater than the diameter of the tapping part in order to form a shoulder with the tapping part.

The tool set preferably includes at least a tap to thread the pencil bore and comprising a tapping part and a shank, and the threading part of the tap and the drilling part of the drill bit have the same length.

The tool set preferably includes a push bar and a collector, this push bar comprising a shank with a head on one end, the shank diameter being greater than that of the head, and the said collector comprising a magnetic part. The magnetic part of the collector is preferably connected to one end of a flexible shank. the flexible shank of the collector allows to easily probe the inside of the combustion chamber to find the pencil position and to recover it using the magnetic part.

The tool set preferably includes at least a centering device for positioning and guiding one or several elements selected from among:
a drill bit during the boring operation of the pencil;
a tap during the thread operation of the bore;
an extractor when screwing the latter in the thread of the pencil;
a push bar during the driving out operation of the pencil, and has the shape of a cylinder being crossed on both sides according to its longitudinal direction by a central duct.

BRIEF DESCRIPTION OF THE DRAWINGS

The invention will be well understood and other aspects and advantages will appear clearly after reading the description that follows, given as an example with reference to the drawing planks attached on which.

DESCRIPTION

In the following description, the term "comprise" is synonymous with "include" and is not restrictive in that it allows for the presence of other elements in the device or the vehicle which it relates to. It is understood that the term "comprise" includes the terms "consists in". On the different figures, the same references indicate similar or identical elements.

In this brief, the process according to the invention will be described in parallel to the tools in relation to the invention for the implementation of the said process.

Figure 1:
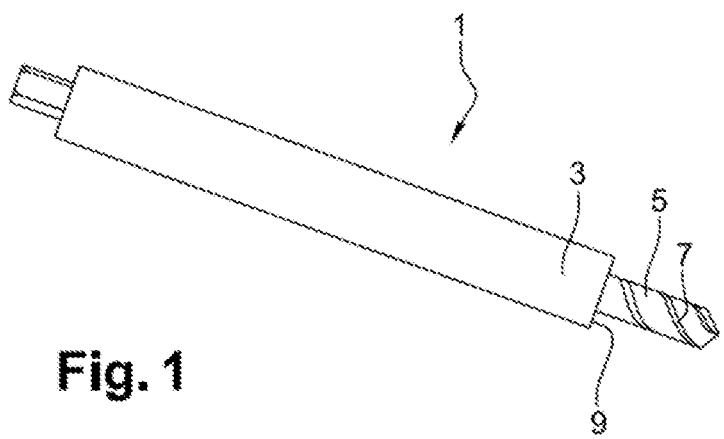
FIG. 1 shows a drill bit according to the invention.

Reference is made in the first place in FIG. 1 in which a drill bit 1 is shown according to the invention used for the implementation of the extraction process for the pencil of a broken glow plug. The drill (1) includes a shank (3) on one end which has a drilling part (5) with flutes (7). The part (5) for drilling a hole has an adapted diameter to be smaller than the diameter of the pencil to be extracted. The drill bit (1) is remarkable in that the shank (3) has a diameter greater than the diameter of the drilling part and of the lower part related to the plug housing, as it will be covered later. The diameter of the drill bit shank is preferably at least 1.5 times greater than the diameter of the drilling part, still at least 1.7 times greater preferably, at least 1.9 times greater preferentially. Thus the drill bit (1) has a shoulder (9) which is intended to come into contact with the shoulder of the housing, as this will be seen later.

The process in relation to the invention includes the following steps:
a) drilling a bore in the pencil according to the longitudinal direction of the latter with the drill bit 1;
b) thread of the said bore using a tap;
c) screwing of an extractor in the said thread;
d) pencil extraction through the extraction of the screwed puller in the pencil.

The process is remarkable in that step a) dealing with the drilling of a bore includes the drilling of the pencil until the shoulder of drill bit 1 is positioned to a stop against the shoulder of the housing.

Figure 2:
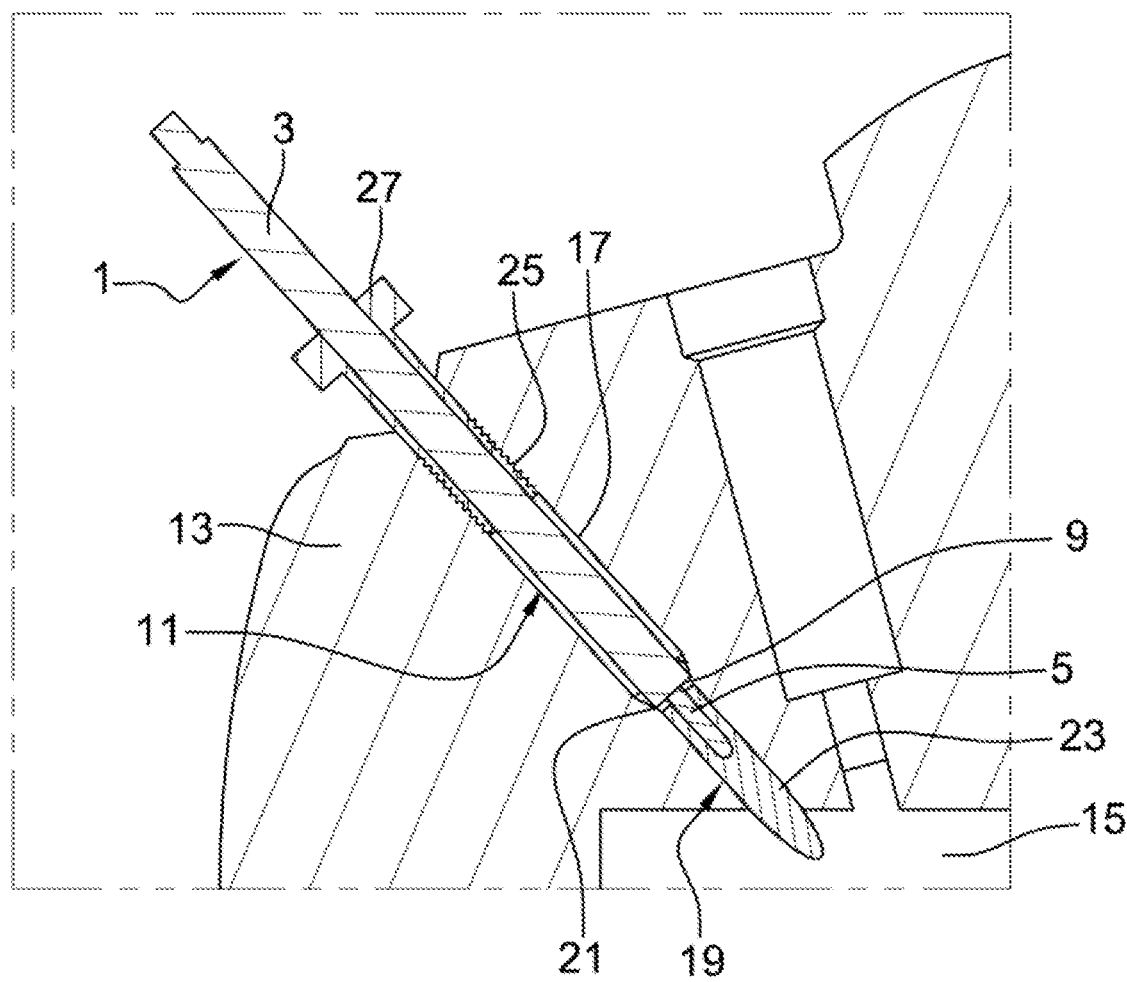
FIG. 2 is a cross sectional view showing the step dealing with the drilling a glow plug pencil using a drill bit and a centering device according to the invention.

Step a) dealing with the drilling of the bore is shown in FIG. 2. In this figure you can see a glow plug housing (11) going through an engine cylinder head (13) from the outer side towards a combustion chamber (15). This housing (11) includes an upper part (17) leading toward the outside and wider than a lower part (19) leading to the combustion chamber (15) so that the lower part (19) of the housing forms a shoulder (21) with the first one. The glow plug comprising a body and a pencil (23), the upper part (17) is intended to receive the body of the plug and the lower part (19) the pencil (23). During engine operation, the glow plug is screwed in its housing thanks to an inner thread (25) visible on the upper part (17) walls of the housing (11).

In FIG. 2 you can see a pencil (23) stuck in the lower part (19) of the glow plug housing which has been broken while unscrewing it. Therefore step a) includes the drilling of a bore in the pencil (23) to be extracted according to the longitudinal direction of the latter, using a drill bit (1) according to the invention. The drilling operation is in progress but the shoulder (9) of the drill bit (1) is already positioned to a stop against the shoulder (21) of the glow plug housing (11). Step a) is completed when these two shoulders (9, 21) will come into contact. The bore performed is intended to be threaded by a tap in step b).

You will understand that the drilling of the bore should be centered in relation to the pencil (23). According to the invention first operating procedure, the diameter of the drill bit (1) shank (3) corresponds to the upper part (17) diameter of the housing (11) for sliding. Thus the drilling step does not require the installation of a centering device. According to a second operating procedure and as shown in FIG. 2, the drilling step is performed using a centering device (27) for positioning and guiding the drill bit (1) and the drill bit shank (3).

The centering device (27) may be a cylinder comprising a duct crossing it on both sides according to its longitudinal direction. This centering device (27) is positioned against the upper part (17) walls of the glow plug housing (11) and preferably includes an outer thread on these walls ready to be operated by screwing with the inner thread (25) of the upper part (17) walls. The central duct has a diameter greater than the diameter of the drill bit (1) shank (3) so that the latter can be inserted there. More specifically, the diameter of the central duct of the centering device (27) and that of the shank (3) of the drill bit (1) are selected so that the shank (3) slides in the said duct but cannot tilt in relation to this duct. The centering device guides the shank (3) according to a determined direction.

Figure 3:
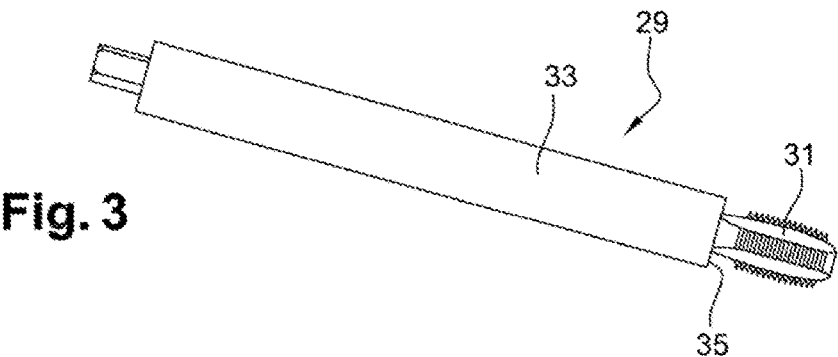
FIG. 3 shows a tap according to the invention.

FIG. 3 shows a tap (29) according to the invention. The said tap (29) includes several parts namely a tapping part (31) and a shank (33). The tapping part (31) of the tap (29) is designed to allow the thread of the bore performed in the pencil 23 during step b). To do this, the tapping part includes flutes and combs, the said combs allowing to thread a bore and flutes so as to evacuate the material chips from the tapping. The flutes may be straight or helical. The tapping part has an entry followed by a guide. The entry of the tapping part is preferably a spiral point entry in that the flutes bear a grinder stroke at its level. Such an entry has the particularity to be tapered by widening from its end up to the guide. Similarly to what has been described previously for the drill bit (1) of the invention, the tap (29) includes a shank (33) with a diameter greater than the tapping part (31) and also greater than the diameter of the lower part of the plug housing (11), so that the shank (33) forms a shoulder (35) with the tapping part (31). The diameter of the tap shank is preferably at least 1.5 times greater than the diameter of the drilling part, still at least 1.7 times greater preferably, at least 1.9 times greater preferentially. The thread operation is completed this way when the shoulder (35) of the tap (29) is positioned to a stop against the shoulder (21) of glow plug housing (11). This shoulder (35) allows not to push too far the tap (29) in the latter. The diameter of the tap (29) shank (33) preferably corresponds to the upper part (17) diameter of the housing (11) for sliding.

Figure 4:
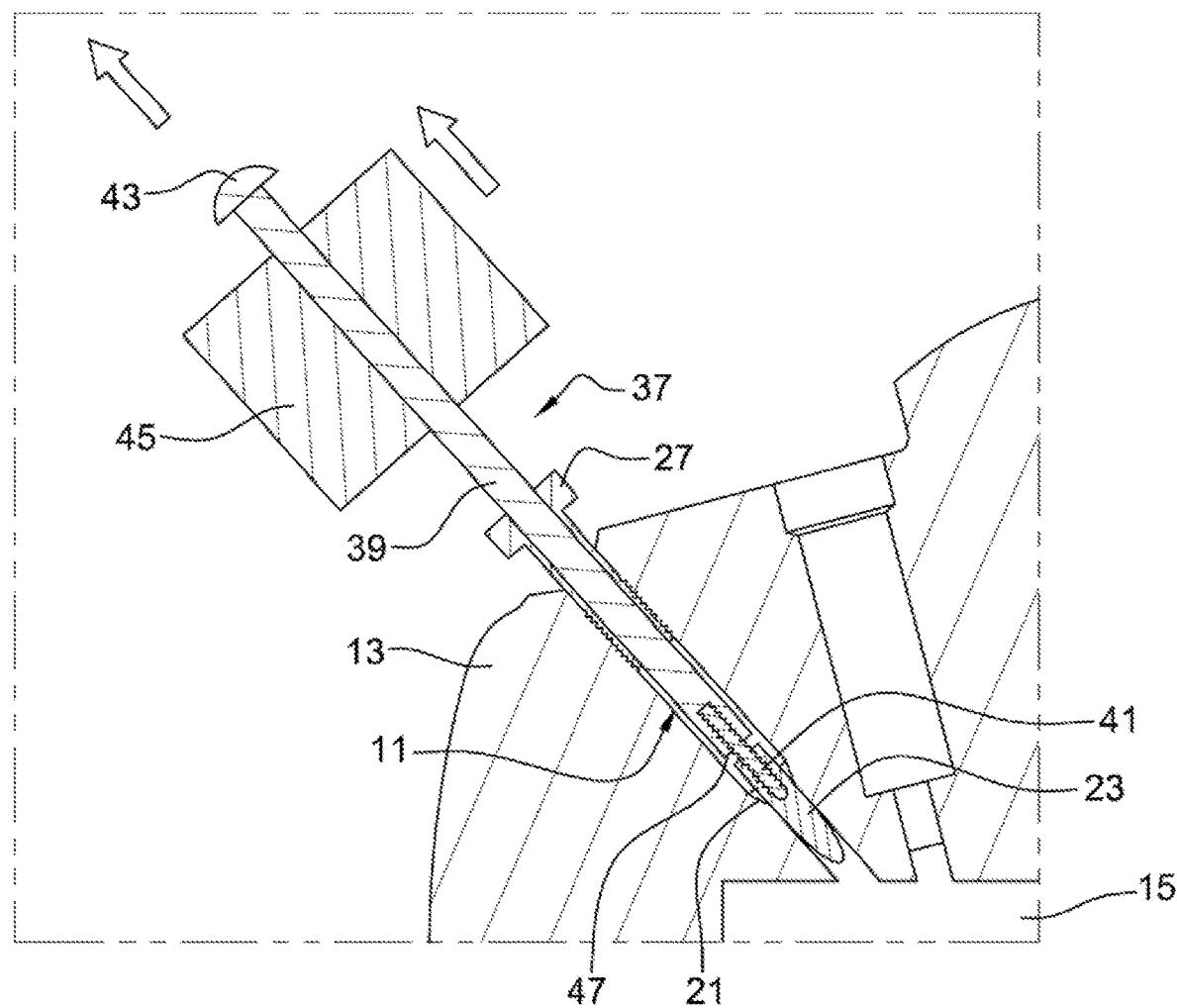
FIG. 4 is a cross sectional view showing the step dealing with the extraction of a glow plug pencil according to the invention.

In FIG. 4, there is an extractor (37) which has been screwed in the thread performed in the pencil (23) during step c). The extractor (37) of the invention includes a shank (39) with a threaded head (41) on one of its ends and a nozzle (43) on the other end preferably. The existence of the nozzle (43) allows you to remove more easily the extractor (37) and to work with a sledge hammer (45) as this will be seen later. The thread of the head (41) corresponds to the thread performed in the pencil (23) performed with the tap. The head (41) of the extractor (37) preferably has a diameter smaller than the shank (39) diameter so that the extractor (37) has a shoulder (47). As it has already been described for the shoulder of the drill bit and that of the tap, this shoulder (47) is intended to get in contact with the shoulder (21) of the glow plug housing (11) in order to signal the end of the step related to the screwing of the extractor in the thread performed in the pencil (23). Preferably and as it is visible on the figure, one end of the shank has a tapped bore and the threaded head is screwed in the said tapped bore of the shank.

According to an operating procedure the invention, before the extractor (37) is screwed on the thread performed in the pencil (23), the extractor (37) is firstly threaded in a sledge hammer (45) designed to come and strike the nozzle (43) of the extractor (37) during step d), as it will be described below. The said sledge hammer (45) preferably has a cylindrical shape but can also have a truncated end tapered with the base of the cone located closer to the extractor (37) nozzle (43). The sledge hammer (45) includes a central duct crossing on both sides according to its longitudinal direction and with a diameter greater than the extractor (37) shank (39) diameter and smaller than the extractor (37) nozzle (43).

FIG. 4 represents step d) dealing with the pencil (23) extraction by the removal of the extractor (37). This removal is done by striking the sledge hammer (45) against the extractor (37) nozzle (43) in the direction of the removal. Pencil 23 is thus extracted through the housing 11 of the glow plug.

It may happen that during the extraction of the pencil in step d), the latter breaks broken so that the pencil broken part is still stuck in the lower part of the housing. According to an operating procedure of the invention, then the process also includes the following steps:

f) expulsion of the pencil (23) broken part in the combustion chamber (15) using a push bar; and
g) the recovery of the pencil 23 broken part through an injector housing opening on the said combustion chamber (15) using a collector.

Figure 5:
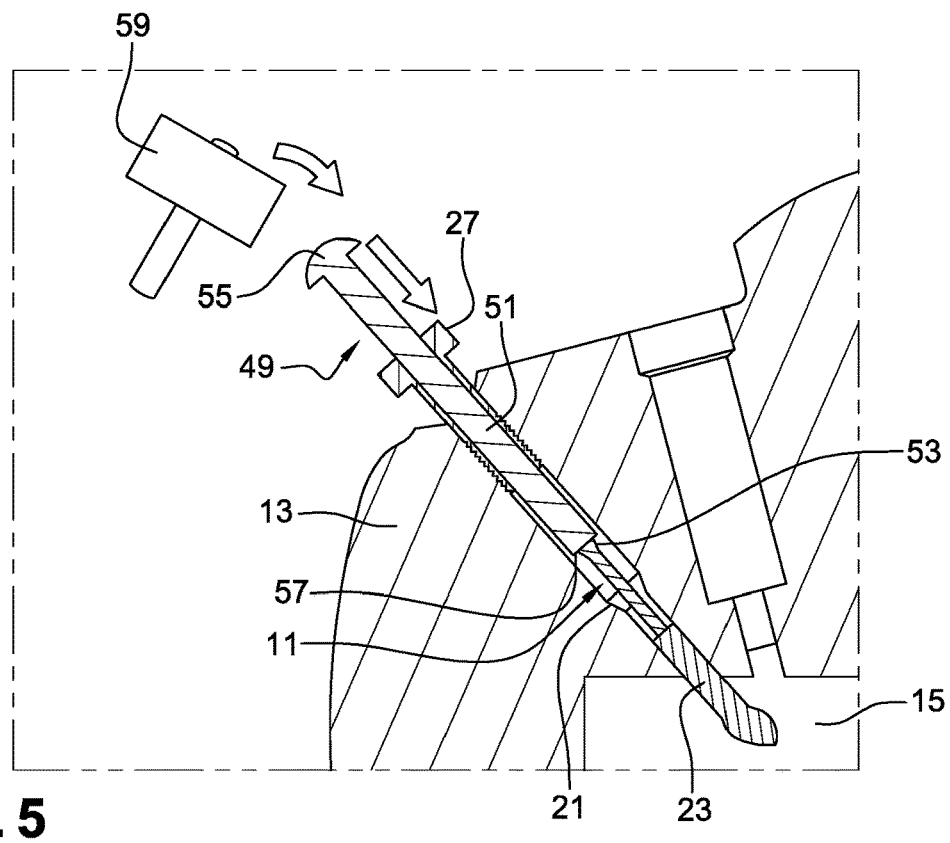
FIG. 5 is a cross sectional view showing the step dealing with the driving out of a glow plug pencil according to the invention.

In addition, it sometimes happens that, because of the strong pressures in the combustion chamber 15, the open end of the pencil 23 leading to this combustion chamber 15 is distorted so that a part of its diameter is increased and can no longer go through the lower part (19) of glow plug housing (11), as it is shown in FIG. 5. Therefore, during step d), the user will not be able to remove the extractor 37 screwed on pencil 23. According to an operating procedure, the extraction process of the pencil 23 also includes the following steps:

e) unscrewing the pencil 23 extractor 37 and removing this extractor 37;

f) driving out the pencil (23) in the combustion chamber (15) using a push bar; and g) the recovery of the pencil 23 through the housing of an injector opening on this combustion chamber 15 using a collector.

Step f) dealing with the driving out of the pencil (23) broken part in the combustion chamber (15) is shown in FIG. 5. In this figure a push bar (49) is shown, the push bar includes a shank (51) with a head (53) on one end and a nozzle (55) on the other end preferably. The shank (51) has a diameter greater than the head (53) in order to form a shoulder (57). Step f) ends when the shoulder (57) of the push bar (49) is positioned to a stop with the shoulder (21) of the plug housing (11). In addition the shank (51) has a diameter smaller than the nozzle (55). The head (53) is preferably long and tapered in order to be able to drive completely the pencil (23) out of its housing. to do this, the length of the head (53) is at least equal to that of pencil (23). The driving out is performed thanks to a striking tool (59) hitting the open end shank of the push bar (49) or the nozzle (55) when the latter is there. In FIG. 5, the expulsion operation is in progress so that the pencil (23) is not fully out of its housing yet.

Figure 6:
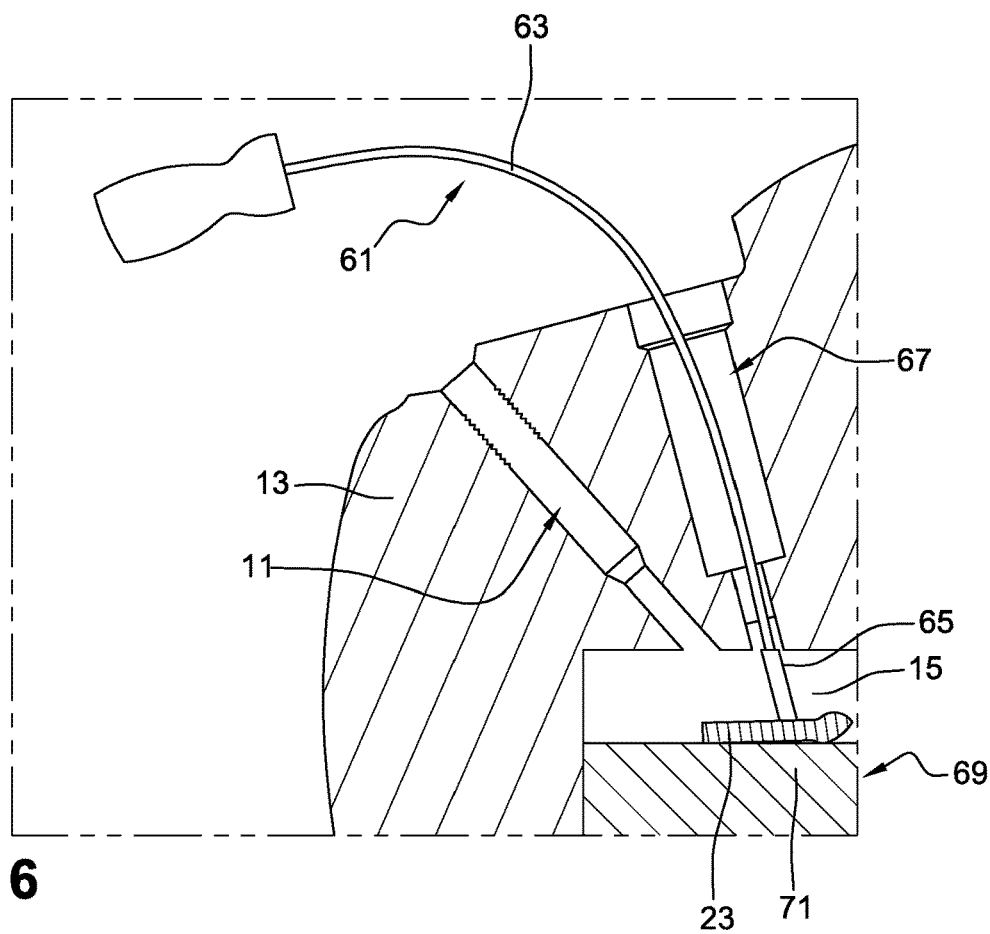
FIG. 6 is a cross sectional view showing the recovery in a combustion chamber of a glow plug pencil according to the invention.

FIG. 6 shows step g) dealing with the recovery of the pencil (23) or the pencil broken part in the combustion chamber (15) using a collector (61). The collector piece (61) of the invention includes a flexible shank piece (63) with a magnetic part piece (65) on one end. This flexibility allows the shank piece (63) to sneak through the housing piece (67) of an injector previously removed and to search in the combustion chamber (15) for the pencil piece (23) expelled. In the combustion chamber there is a piston (69) comprising a head (71) in the upper part. During the driving out of the pencil (23), the latter is located on the upper surface of the piston head (71), as it is shown. The magnetic piece (65) part allows to fix the pencil piece (23) to the collector piece (61) which will then be out through the housing piece (67) of the injector.

It is noted that this patent claims priority from Belgian Patent Application Serial Number BE 2017/5175 which was filed on Mar. 21, 2017, and French Utility Model 1770295, filed on Mar. 24, 2017. Both Belgian Patent Application Serial Number BE 2017/5175 and French Utility Model 1770295 are hereby incorporated by reference in their entireties.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A tool set to extract a glow plug pencil stuck in a glow plug housing, the glow plug housing having a lower part and an upper part, the lower part having a first diameter smaller than a second diameter of the upper part, the glow plug pencil stuck in the lower part, the tool set comprising:

a drill bit to drill a bore in the glow plug pencil, the drill bit having a drilling part and a drill shank, the drill shank having a third diameter greater than a fourth diameter of the drilling part to define a drill bit shoulder, the third diameter of the drill shank being greater than the first diameter of the lower part of the glow plug housing;

a tap to thread the bore of the glow plug pencil;

an extractor to extract the glow plug pencil; and a centering device structured to at least one of position or guide at least one of:

the drill bit when drilling the bore in the glow plug pencil;

the tap when threading the bore; or the extractor when at least one of screwing the extractor in the thread bore of the glow plug pencil or extracting the extractor; and a push bar to expel the glow plug pencil and a collector to retrieve the expelled pencil located in a combustion chamber.

2. The tool set as claimed in claim 1, wherein the push bar has a push bar shank having a push bar end with a push bar head, a ninth diameter of the push bar shank being greater than a tenth diameter of the push bar head, and the collector including a magnetic part connected to a flexible rod.

3. The tool set as claimed in claim 1, wherein the centering device is to at least one of position or guide the push bar when the push bar expels the glow plug pencil.

* * * * *